Patented Jan. 7, 1941

2,227,633

UNITED STATES PATENT OFFICE 2,227,633

CITRATES OF PROCAINE

David Curtis, New York, N. Y.

No Drawing. Application May 19, 1936,
Serial No. 80,551

2 Claims. (Cl. 260—472)

The present invention relates to the salts of anaesthetic bases with aliphatic, poly-carboxylic acids of the fruit acid group, in which at least one hydrogen of one carboxyl group of the acid is left uncombined with the anaesthetic base.

In my co-pending application, Serial No. 28,267, filed June 25, 1935, I have described mono-procaine tartrate, which is an unsaturated salt of procaine base and tartaric acid, together with its uses, and in my co-pending application Serial No. 26,037, filed June 11, 1935, I have described similar unsaturated salts of procaine base with citric acid, namely, mono-procaine citrate and di-procaine citrate, and gave their uses.

I have found that all of the incompletely combined fruit acid salts of all anaesthetic bases have similar properties and may be similarly prepared.

Such salts comprise the group of mono-molecular union of any anaesthetic base of the group of aryl, alkyl or alkamine esters of amino benzoic acid in all its isomeric forms, with malic and tartaric acid, and the mono and dimolecular compound of such anaesthetic bases with citric acid.

The foregoing acids have the common characteristic in that they have two or more combinable hydrogen atoms in their carboxyl groups to which the base may be linked, and they may form saturated or unsaturated salts with the bases. When an unsaturated salt is formed with any of these acids, in which at least one of the hydrogen atoms in the carboxyl group is uncombined with the base, it has the characteristic of being acid in solution and giving a reaction on the acid side of the pH scale. This common characteristic of these salts gives them the particular value that they may readily and successfully be used as stabilizers of solutions of anaesthetic substances or salts that are alkaline in reaction, to prevent the decomposition of not only the vaso-constrictor commonly used in the anaesthetic solution, but of the alkaline anaesthetic substance itself, which would otherwise saponify and break up.

Taking procaine as an example of an ester of amino benzoic acid, the following substances or salts may be enumerated:

Mono-procaine tartrate represents the union of unimolecular equivalents of procaine base and tartaric acid, in which only one of the combinable hydrogen atoms is taken up by the procaine base. Its formula is

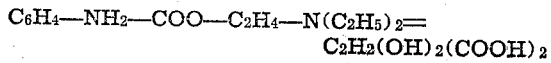

When first formed it is an amber colored resinous substance of low melting point. A 2.36% solution with respect to the base gives a pH of about 4.0, brom-phenol blue indicator. Upon dehydration assumes a crystalline nature.

Mono-procaine citrate represents the union of unimolceular equivalents of procaine base with citric acid. It has the formula of $C_6H_4—NH_2—COO—C_2H_4N(C_2H_5)_2 =$
    $COOH—CH_2—C(OH)—(COOH)—CH_2(COOH)$ It is a white crystalline powder of a melting point of about 130–131° C. A 2.36% solution of it with respect to the base, gives a pH of about 4.0 on brom-phenol blue and 4.1–4.2 on brom-cresol green.

Di-procaine citrate represents the union of two molecules of procaine base with one molecule of citric acid. Its formula is

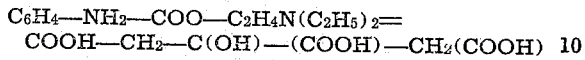

It is a white crystalline powder having a melting point of about 120–121° C. A 2.36% solution of it, with respect to the base, gives a pH of about 5.0 to 5.1, methyl red.

Mono-procaine malate has the formula of

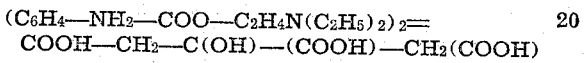

It is a light amber colored, balsamic, tacky, resinous substance of low melting point. A 2.36% solution of it, with respect to the base, gives a pH of about 4.4 brom-phenol blue.

All of the above substances are soluble in alcohol and in water. Because of their water solubility, the solutions of these salts may be made directly by dissolving the proper proportions of the reacting ingredients in water and facilitating the solution by heating and stirring. Thus, for example, a 2.36% solution of mono-procaine tartrate, with respect to the procaine base, may be prepared by dissolving 1.507 grams of tartaric acid in about 50 cc. of water, by bringing it to a boil, adding 2.36 grams of procaine base to the solution, bringing the solution to a boil again, removing the heat and stirring until solution is complete, and then adding water to make up the solution to about 100 cc.

The pure salts may be obtained from its aqueous solution by a careful evaporation of the water. They may also be prepared by dissolving the ingredients in the proper proportions in a volatile vehicle, such as acetone or alcohol, stirring to effect solution and chemical combination, and crystallizing from the volatile vehicle by evaporation.

It may here be stated that the uncombined combinable hydrogen of the acid need not necessarily be free, but may be combined with a metallic element or organic substance. In other words, instead of combining the anaesthetic base with tartaric acid, for instance, it may be combined with potassium or sodium acid tartrate, which are unsaturated tartaric acid salts. And I wish it to be understood that whenever the term acid is used in the specification and claims, it is intended to include such unsaturated salts of the acids.

Thus, $NaHC_4H_4O_6$ (sodium acid tartrate) plus procaine base, yields $NaHC_4H_4O_6$:procaine. The structural formula of a compound of this type would be

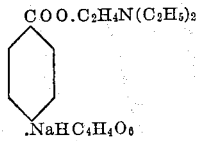

These substances may be prepared by the same general method of dissolving the ingredients in acetone or the like and crystallizing therefrom. All of these salts are slightly acid but not as acid as the salts made with the acids themselves.

A valuable procaine salt made with an unsaturated salt of these fruit acids is one in which the boric acid radicle is present. As an example, we may take procaine-potassium-boro-tartrate. Potassium-boro-tartrate is made up by completely dissolving the component ingredients in a common solvent and evaporating the solvent. The resulting salt is an acid salt, and may therefore be considered as an unsaturated acid salt of tartaric acid. When the anaesthetic base is combined with this potassium-boro-tartrate, by way of the available methods it yields a product which is strongly anaesthetic and strongly alkaline in reaction. Thus 2.36 grams of procaine base will combine with 3.5 grams of anhydrous potassium boro-tartrate, and when made up to 100 cc., it gives a pH of 7.7, and is strongly alkaline to litmus paper.

As examples of other anaesthetic base salts of the tartaric, citric and malic acid, of the type covered by the present invention, we may take benzocaine salts.

Benzocaine mono-tartrate, which has the formula of $C_6H_4NH_2.COO.C_2H_5:C_2H_2(OH)_2(COOH)_2$, is a white crystalline powder, the crystals arranging themselves in drape-like formation around the walls of the crystallizing vessel, and has a relatively low melting point. It is sparingly soluble in water, but a 1% solution of the salt, in hot water, gives a pH of about 3.1, brom-phenol blue.

Mono-benzocaine citrate, which has the formula of

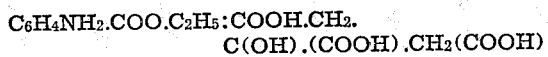

is a white crystalline powder, with crystals of stellar formation. It is also sparingly soluble in water, but a one percent (1%) solution of the salt in hot water gives a pH of about 2.7 thymol blue. It has a relatively low melting point.

Di-benzocaine citrate, which has the formula of

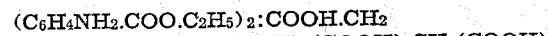

is a white crystalline powder, crystallizing in sheaves. It has a low melting point and is sparingly soluble in water. A 1% solution of the salt in hot water gives a pH of about 3.1, brom phenol blue.

Mono-benzocaine malate has the formula of

It is a grayish white mass, of crystalline structure. The crystallization is arranged in crystals of a waxy appearance. Upon melting it becomes amber colored and tacky. Its melting point is about 86–88° C. It is also sparingly soluble in water. A 1% solution of the salt in hot water gives a pH of about 3.1, brom-phenol blue.

All of the last three salts may be prepared by crystallization from acetone in the same manner as the procaine salts. All of these salts are also soluble in alcohol. The salts may also be formed by combining with unsaturated salts of the acids, similarly to procaine. Thus benzocaine-sodium-hydrogen-tartrate may be formed by direct union of the ingredients in solution form. For example, 19.07 grams of the hydrous sodium acid tartrate may be dissolved in a suitable amount of water, and separately, 16.5 grams of benzocaine may be dissolved in alcohol, or glycol and its derivatives, and the two solutions combined.

This completes the description of the anaesthetic substances of the present invention, and it is to be understood that I do not wish to be limited to the specific examples described herein, as, obviously, numerous other substances may be made, all within the spirit and scope of the present invention and the claims hereto appended.

What I claim as my invention is:

1. As a new anaesthetic compound, di-procaine citrate, having the formula of

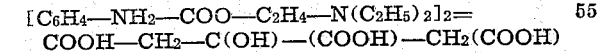

2. As new compounds, the salts of procaine base with citric acid in which the procaine base and the citric acid are combined in such proportions that part of the replaceable hydrogen in the citric acid remains uncombined with the procaine base.

DAVID CURTIS.